US010237369B2

(12) United States Patent
Eyal

(10) Patent No.: US 10,237,369 B2
(45) Date of Patent: Mar. 19, 2019

(54) OPPORTUNISTIC BACKHAULING OF DATA FOR FINE TIME MEASUREMENT (FTM) RESPONDER SYSTEMS

(71) Applicant: INTEL IP CORPORATION, Santa Clara, CA (US)

(72) Inventor: Elad Eyal, Shoham (IL)

(73) Assignee: Intel IP Corporation, Santa Clara, CA (US)

( * ) Notice: Subject to any disclaimer, the term of this patent is extended or adjusted under 35 U.S.C. 154(b) by 494 days.

(21) Appl. No.: 14/757,668

(22) Filed: Dec. 23, 2015

(65) Prior Publication Data

US 2017/0187830 A1   Jun. 29, 2017

(51) Int. Cl.
| | |
|---|---|
| *H04L 29/06* | (2006.01) |
| *H04L 29/08* | (2006.01) |
| *H04W 40/22* | (2009.01) |

(52) U.S. Cl.
CPC ........ *H04L 67/327* (2013.01); *H04L 65/4076* (2013.01); *H04W 40/22* (2013.01)

(58) Field of Classification Search
CPC ... H04L 67/327; H04L 45/74; H04L 61/6063; H04L 65/4076
See application file for complete search history.

(56) References Cited

U.S. PATENT DOCUMENTS

2008/0234012 A1*   9/2008  Liu ................... H04W 52/0232
                                                            455/574
2014/0355461 A1*  12/2014  Aldana ..................... G01S 5/00
                                                            370/252

(Continued)

FOREIGN PATENT DOCUMENTS

WO       2015041708 A1    3/2015

OTHER PUBLICATIONS

Stanton, K. et al., "Addition of p802.11-MC Fine Timing Measurement (FTM) to p802.1AS-Rev:Tradeoffs and Proposals", IEEE 802.1 Plenary, Mar. 2015, Available at http://www.ieee802.org/1/files/public/docs2015, 22 pages.

(Continued)

*Primary Examiner* — Wing F Chan
*Assistant Examiner* — Billy H Ng
(74) *Attorney, Agent, or Firm* — Finch & Maloney PLLC

(57) ABSTRACT

Techniques are provided for opportunistic backhauling of data in a deployment of FTM Responder systems. An example FTM Responder may include a backhaul payload processing circuit configured to determine a requirement to transmit a first instance of backhaul data to a first destination device. The FTM Responder may also include an FTM request handler circuit configured to receive a first FTM request from a first mobile station. The FTM Responder may further include an FTM response generation circuit configured to generate an FTM response that includes FTM data responsive to the request and a first backhaul payload message. The first backhaul payload message includes an address of the first destination device and further includes the first instance of backhaul data. The FTM Responder may further include a transceiver circuit configured to transmit the FTM response to the first mobile station. The FTM Responder may be an FTM capable wireless access point (AP).

27 Claims, 11 Drawing Sheets

(56) References Cited

U.S. PATENT DOCUMENTS

2015/0365805 A1* 12/2015 Bajko .................... G01S 13/767
455/456.1
2016/0255463 A1* 9/2016 Das ........................ H04W 4/02
455/456.1

OTHER PUBLICATIONS

International Search Report for Patent Application No. PCT/US2013/078116, dated Jun. 11, 2014, 3 pages.

* cited by examiner

800

| Category 802 | Public Action 804 | Trigger 806 | LCI Meas Req 808 | Loc Civic Meas Req 810 | FTM Params 812 | Backhaul Payload IE 814 |
|---|---|---|---|---|---|---|
| (1) | (1) | (1) | (var) | (var) | (var) | (var) |

FTM Request Frame Format
816

| Category 822 | Public Action 824 | Dialog Token 826 | Followup Dialog Token 828 | TOD 830 | TOA 832 |
|---|---|---|---|---|---|
| (1) | (1) | (1) | (1) | (6) | (6) |

| TOD Error 834 | TOA Error 836 | LCI Report 838 | Loc Civic Report 840 | FTM Params 842 | Backhaul Payload IE 814 |
|---|---|---|---|---|---|
| (2) | (2) | (var) | (var) | (var) | (var) |

FTM Measurement Frame Format
844

| Element ID 850 | Length 852 | Backhaul Message Recipient 854 | Delivery Confirmation Token 856 | Backhaul MSG TTL 858 | Opaque Payload Length 860 | Opaque Payload Content 862 |
|---|---|---|---|---|---|---|
| (1) | (1) | (var) | (2) | (2) | (2) | (var) |

Backhaul Payload Information Element
866

FIG. 8

OPPORTUNISTIC BACKHAULING OF DATA FOR FINE TIME MEASUREMENT (FTM) RESPONDER SYSTEMS

BACKGROUND

A number of reliable outdoor navigation systems are widely available. These systems typically rely on the deployment of a global satellite network such as, for example, the Global Navigation Satellite System (GNSS), the Global Positioning System (GPS) and the GALILEO satellite system. These satellites transmit signals that provide accurate timing information as well as the location of the satellite. A ground receiver that has a line-of-sight to the satellites may pick up these signals from three or more satellites and estimate its own position by calculating the distance to each of the satellites based on the travel time of the signal from the satellite to the ground receiver and further based on the known locations of the satellites. Indoor environments, however, generally limit the reception of such line-of-sight satellite signals rendering GPS-based systems unworkable. One solution to the indoor navigation problem is based on a deployment of transceivers or responders throughout the indoor structure, such as, for example stationary Wireless Fidelity (Wi-Fi) stations or access points (APs) that conform to the IEEE 802.11 standard. A mobile station, for example a hand held user device, may then estimate its location based on signal Time-of-Flight (ToF) measurements with respect to a number of these fixed stations, using a technique known as the 802.11 Fine Time Measurements (FTM) procedure. The user's mobile equipment performs the FTM procedure with one or more stationary FTM capable stations or APs (e.g., FTM Responders) and estimates the distance to each FTM Responder, to calculate its location relative to each of the Responders' locations. There are a number of non-trivial issues associated with respect to managing FTM responders.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 8 illustrates message formats for opportunistic backhauling of data, in accordance with certain of the embodiments disclosed herein.

Figure 1:
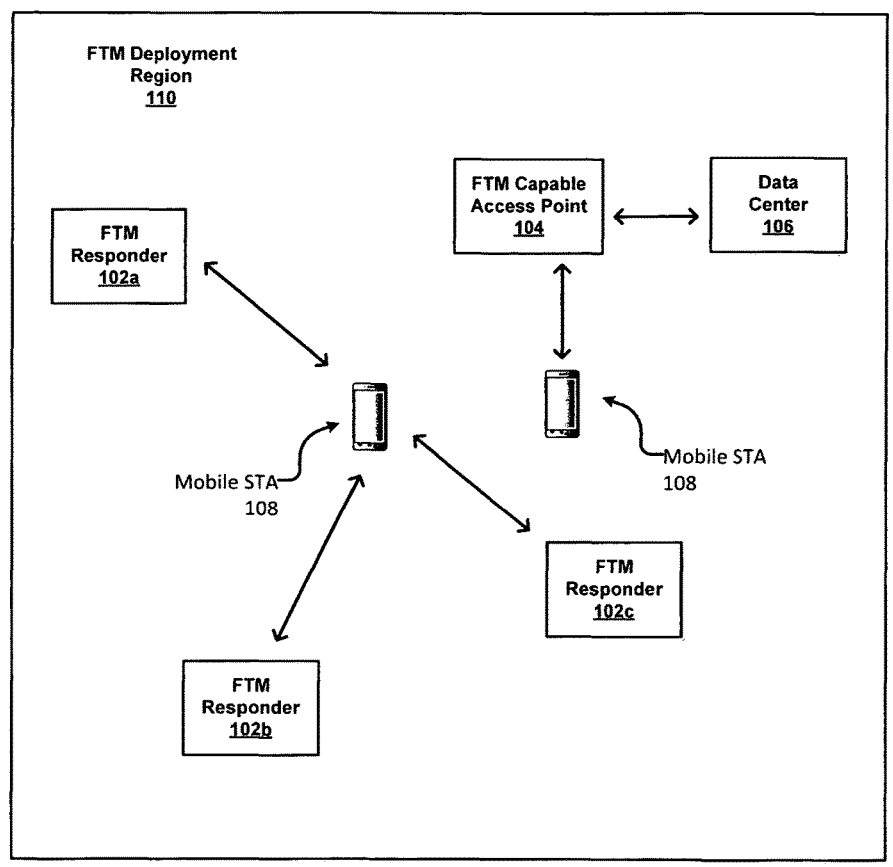
FIG. 1 is a top level diagram of a deployment of FTM Responders with opportunistic backhauling capability within a region, in accordance with certain of the embodiments disclosed herein.

Although the following Detailed Description will proceed with reference being made to illustrative embodiments, many alternatives, modifications, and variations thereof will be apparent to those skilled in the art.

DETAILED DESCRIPTION

As noted above, there are a number of non-trivial issues associated with respect to managing FTM responders, particularly with respect to FTM responders that are effectively isolated from their data center. For instance, in areas where Wi-Fi coverage is available, FTM Responders or FTM capable APs can be deployed and may utilize the Wi-Fi network in order to obtain backhaul access (e.g., for purposes of communicating with a venue owner's data center) in order to collect traffic statistics, deploy software updates, handle security issues, and communicate configuration changes and status information and the like. Unfortunately, Wi-Fi coverage is not always available for indoor locations. In such situations, the FTM responder is isolated from its data center. In one possible solution to this FTM isolation problem, a wired backhaul is provided to some or all of the FTM Responders. This solution is expensive, however, because it involves adding fixed infrastructure, such as routing cables through ceilings and walls. Another possible solution employs a cellular data link for backhaul (or other out-of-band wireless solution). This solution is also expensive because it requires additional hardware (a cellular modem) in each FTM Responder. Additionally, this solution is not always viable. For example, an underground parking facility may not be served by any particular cellular operator. Still another solution may employ a Wi-Fi mesh to create Wi-Fi coverage across the entire venue, and use this Wi-Fi mesh to provide the backhaul. This solution is not always practical because the deployment required for a reliable Wi-Fi mesh is denser than the deployment needed to only provide positioning capability. Also, participation in a Wi-Fi mesh incurs additional costs in terms of energy consumption.

Thus, this disclosure provides techniques for opportunistic backhauling of data for Fine Time Measurement (FTM) Responder systems. The techniques are particularly useful for FTM responders systems that are typically incorporated in a navigation or location/positioning system, but can be used in conjunction with any system that includes responders having access to mobile end user devices, as will be appreciated in light of this disclosure. In accordance with an embodiment, such FTM Responders are configured to embed a backend payload message into a given standard responder communication framework that is received by a mobile end user device. The mobile end user device can then transparently forward that backend payload message to another responder or to a data center. To this end, the techniques effectively leverage known infrastructure and the ubiquitous nature of mobile devices to provide a backhaul channel for isolated responders. In some example embodiments, a navigation system including FTM responders may be deployed in an indoor environment or venue where access to GPS and wireless communications are not available or reliable. The FTM Responders are configured to provide timing and other information to mobile devices that request this service so that the mobile devices can estimate their location, as normally done. In addition, however, the FTM Responders are further configured to, on occasion, communicate backhaul data between each other and/or to and from a data center associated with the venue or with other backend componentry of the given communication system. The data center and/or other backend componentry may generally be configured to provide management of the communications network that includes the FTM Responders, mobile devices, access points, etc.

Backhaul data may include, for example, traffic statistics, software updates, security related data, configuration changes and other status information. The techniques described herein enable the FTM Responders to embed the backhaul data in the FTM response that is transmitted to the mobile device. At a later time, when the mobile device is within range of another FTM Responder or FTM capable Wi-Fi access point (AP), the mobile device may forward the backhaul data to that new FTM Responder by embedding it in a new FTM request to that Responder. The new FTM Responder may then forward that backhaul data, for example to the data center, as will be described in greater detail below.

As will be further appreciated in light of this disclosure, the techniques described herein for opportunistic backhauling of FTM Responder data within an FTM deployment region provide for generally increased efficiency and lower cost compared to existing techniques that require wired backhaul networks, cellular data links or deployment of a Wi-Fi Mesh. The additional embedded backhaul data represents a relatively small increase to the size of the FTM messages and therefore does not adversely impact bandwidth or device power consumption. Although embodiments disclosed herein are described in terms of IEEE 802.11 Wi-Fi compatible networks and equipment, it will be further appreciated in light of this disclosure that these techniques (e.g., opportunistically embedding backhaul data in messages between stationary and mobile devices for the purpose of forwarding that data to other locations) are applicable to other communication formats or standards as well. These techniques can be implemented in hardware or software or a combination thereof.

FIG. 1 is a top level diagram 100 of a deployment of FTM Responders with opportunistic backhauling capability within a region or venue, in accordance with certain of the embodiments disclosed herein. A user's mobile communication device 108 is located in the FTM deployment region 110. The mobile device 108 may sometimes be referred to as a mobile station (mobile STA) or user equipment (UE). The FTM deployment region 110 may be an indoor environment where the provision of location or navigation services is desired for users of mobile devices 108, but where satellite or other communication signals are not available. Examples of such indoor environments may include underground parking structures, enclosed entertainment or shopping venues, and the like. A network of FTM Responders including 102a, 102b, 102c are located at various positions throughout the region such that the mobile STA 108 can transmit FTM requests and receive FTM responses from a sufficient number of FTM Responders to calculate a position. The FTM Responders 102 may be isolated from direct communications other than through opportunistic encounters with passing mobile devices. One or more of the FTM Responders, however, may be an FTM capable Wi-Fi access point (AP) 104 configured to communicate with the venue data center 106 and/or other entities not shown. The FTM capable Wi-Fi access point (AP) 104 and the FTM responders 102 may also be referred to as a stationary station (stationary STA).

The FTM Responders 102, FTM capable APs 104 and mobile STAs 108 may all be configured to provide opportunistic backhaul data capability, for example through embedding of such data in FTM request and response messages, and through other techniques, as will be described in greater detail below.

As previously mentioned, backhaul data may include data traffic statistics, software updates, security related data, configuration changes and other status information such as the battery power level for the FTM Responder and the physical location of the FTM Responder. Some of this information may need to be pushed from a central repository (e.g., the data center or one of the FTM Responders) when it is updated. For example, an FTM Responder would normally provide its physical location to nearby mobile devices and this data may need to be pushed from the centralized repository when updated. Similarly, an FTM Responder may also need to publish the locations of nearby FTM Responders, and this information may also be pushed to the FTM Responders. As a further example, a battery-operated FTM Responder may need to notify a central authority when the battery is running low and needs to be replaced.

Figure 2:
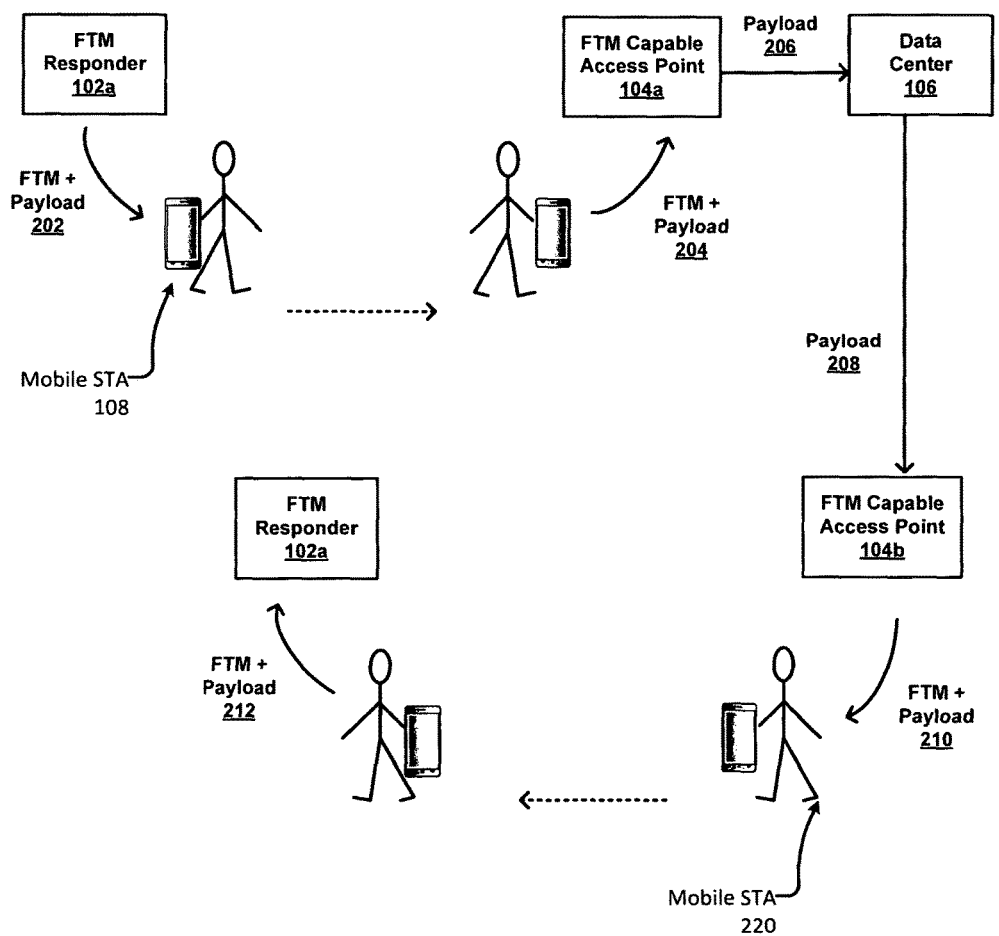
FIG. 2 illustrates a usage case of FTM Responders with opportunistic backhauling capability, configured in accordance with certain of the embodiments disclosed herein.

FIG. 2 illustrates a usage case 200 of FTM Responders with opportunistic backhauling capability, configured in accordance with certain of the embodiments disclosed herein. This figure provides a simplified illustration of a user of a mobile STA 108 traveling through an FTM deployment region such as 110. After coming in contact with (e.g., making an FTM request to) a first FTM Responder 102a, the mobile STA 108 receives a response 202 that includes the FTM data and a backhaul payload. The backhaul payload format will be described in greater detail below in connection with FIG. 8. The backhaul payload may include data indicating, for example, that FTM Responder 102a may need a battery replacement in the near future. At a later point in time, the user and mobile STA 108 comes in contact with an FTM capable AP 104a and makes an FTM request 204 with the embedded backhaul payload. The request may be made, whether or not an actual FTM was required at that time, so that the backhaul payload is forwarded. The FTM capable AP 104a may then forward the backhaul payload 206 to the data center 106, through any available communication link or other mechanism, so that the battery condition may be addressed, for example by scheduling a maintenance visit to the site of Responder 102a.

The communication may optionally be completed with an acknowledgment process in which the data center forwards a payload 208 with a confirmation message to the same (or a different) FTM capable AP, 104a or 104b. Another passing user and mobile STA 220 (or the same one as before 108) may then carry this confirmation payload back through an FTM response with embedded backhaul payload 210. When the mobile STA gets in range of the FTM Responder 102a it may then forward the confirmation payload to the Responder through another FTM request 212. The FTM Responder 102a may then cease requesting passerby mobile STAs to forward that message to the data center.

Figure 3:
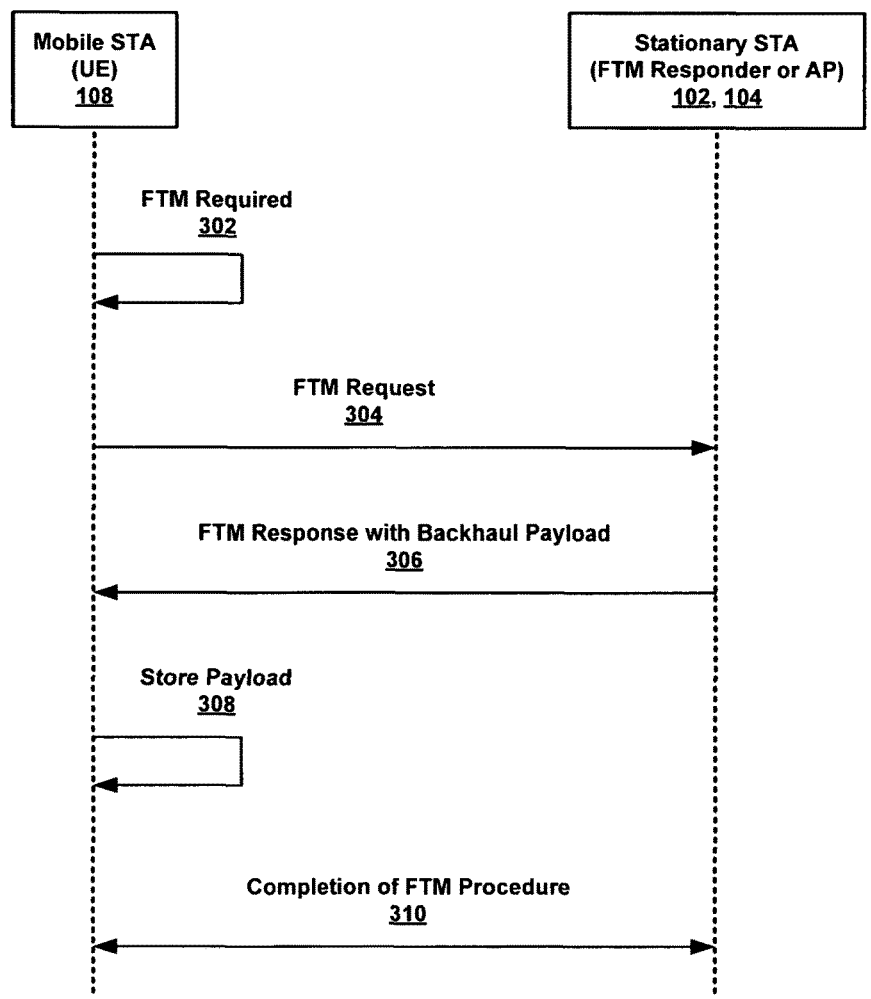
FIG. 3 is a diagram illustrating dataflow between a mobile station and a stationary station, in accordance with certain of the embodiments disclosed herein.

FIG. 3 is a diagram illustrating dataflow 300 between a mobile station and a stationary station, in accordance with certain of the embodiments disclosed herein. This figure illustrates a process for the case where the FTM Responder determines that it has backhaul data to push out to a recipient and the mobile STA is required to receive and save this information for later forwarding to the recipient. The mobile STA 108 first determines that an FTM is required 302. An FTM request 304 is then transmitted to the stationary STA, which may be an FTM Responder 102 or an FTM capable AP 104. The stationary STA 102, 104 then transmits an FTM response with an embedded backhaul payload 306. The mobile STA 108 stores the payload in memory for future transmission/forwarding 308 and then completes the FTM procedure 310 to determine its location. The backhaul payload includes a recipient or destination address in addition to the payload data and other fields that will be described below. The destination address may take the form of a media access control (MAC) address of a particular station (AP or FTM Responder), or of a multicast group address when multiple recipients are intended. The destination address may also be an out-of-band (OOB) address such as, for example, a transmission control protocol (TCP) host name and port, a cellular phone connection address or an address in a wireless wide area network (WWAN). Such OOB addresses allow for tunneling or use of alternative transport mechanisms that the mobile STA may be able to employ to advantage.

Figure 4:
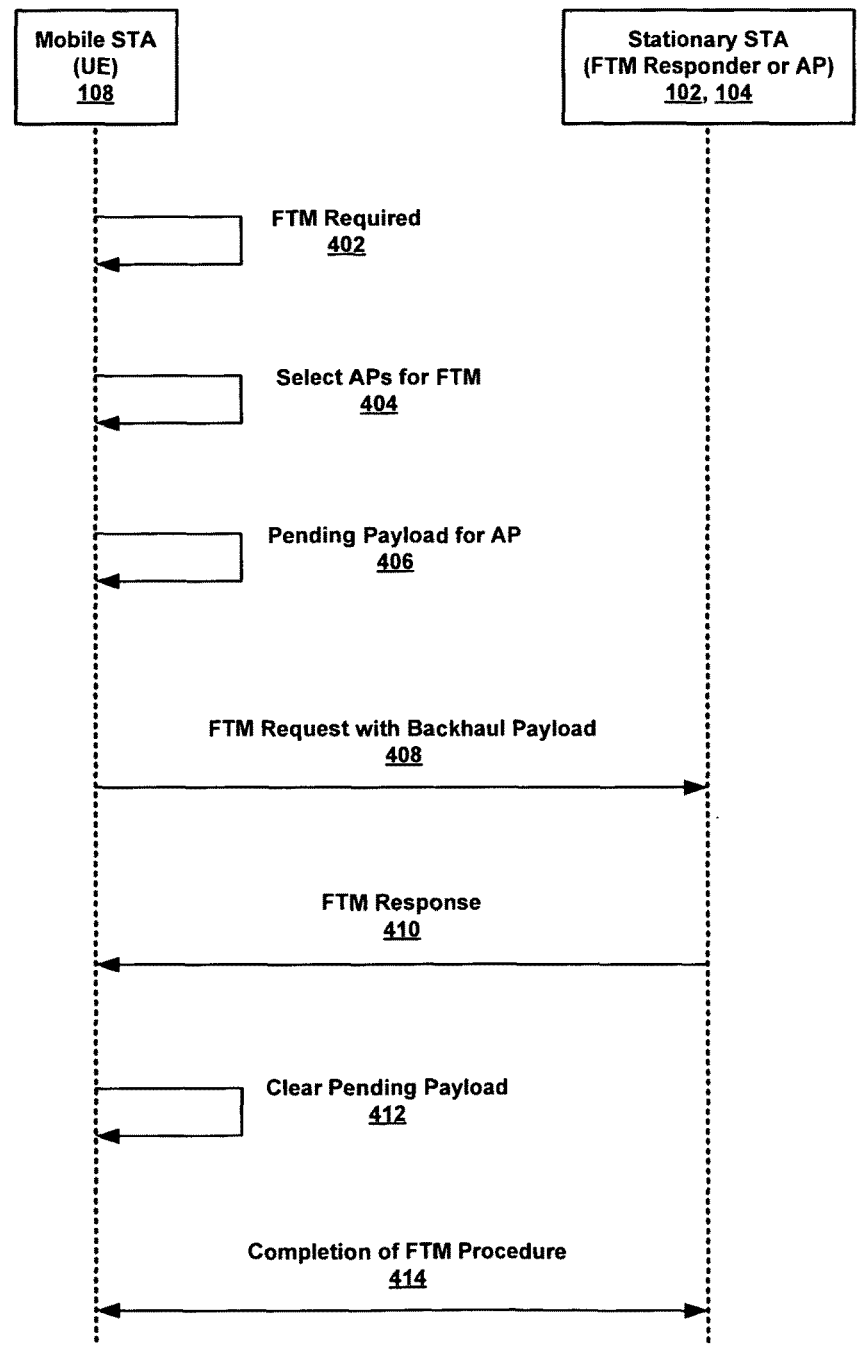
FIG. 4 is a diagram illustrating another dataflow between a mobile station and a stationary station, in accordance with certain of the embodiments disclosed herein.

FIG. 4 is a diagram illustrating another dataflow 400 between a mobile station and a stationary station, in accordance with certain of the embodiments disclosed herein. This figure illustrates a process for the case where the initiator of the FTM procedure (the mobile STA) has a pending backhaul payload which was delivered to the mobile STA, for example, through the procedure described above in FIG. 3. The mobile STA 108 first determines that an FTM is required 402. The mobile STA 108 then selects 404 an FTM capable AP and determines that there is a pending backhaul payload 406 stored in memory for this AP based on the destination address included in the backhaul payload. An FTM request with the embedded backhaul payload is then transmitted 408 to the FTM capable AP 104. The FTM capable AP 104 then transmits an FTM response 410. The mobile STA 108 clears the payload from memory 412 and then completes the FTM procedure 414 to determine its location.

Figure 5:
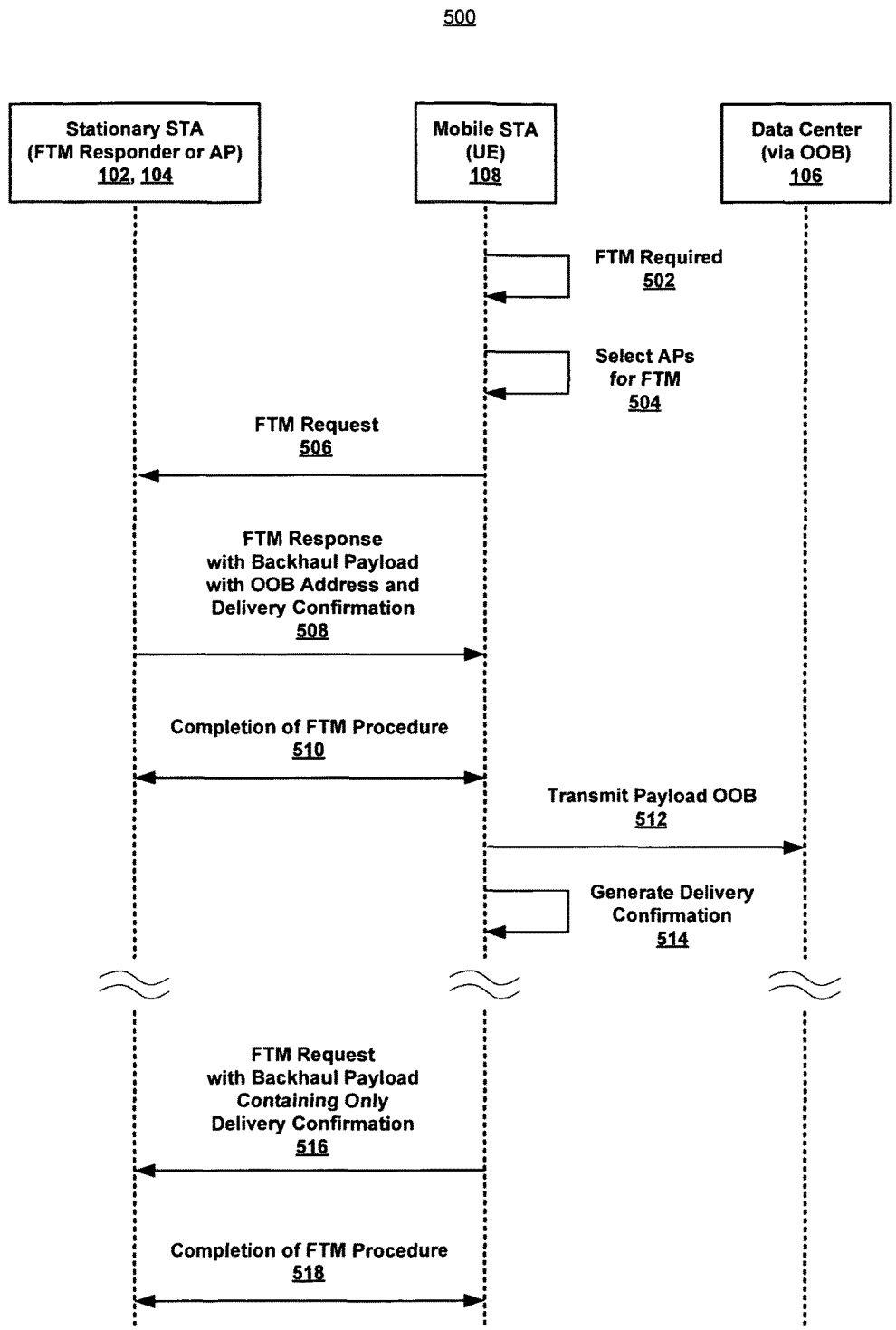
FIG. 5 is a diagram illustrating another dataflow between a mobile station, a stationary station and a data center, in accordance with certain of the embodiments disclosed herein.

FIG. 5 is a diagram illustrating another dataflow 500 between a mobile station, a stationary station and a data center, in accordance with certain of the embodiments disclosed herein. This figure illustrates a process for the case where a stationary STA requests a backhaul delivery with an OOB destination address and a delivery confirmation. The mobile STA 108 first determines that an FTM is required 502. The mobile STA 108 then selects 504 an FTM Responder 102 or an FTM capable AP 104, and transmits an FTM request 506. The stationary STA 102, 104 provides an FTM response 508 with backhaul payload, an OOB destination address and a delivery confirmation request. The mobile STA 108 completes the FTM procedure 510 to determine its location and then transmits the backhaul payload 512 to the data center 106 using an OOB channel when that channel is available. For example, if the OOB channel is a cell phone connection, the transmission may be completed when the mobile STA travels into a region with cell phone coverage. If the delivery to the data center is successful, the mobile STA generates a confirmation 514 to be stored locally on the mobile STA. At a subsequent point in time, if and when the mobile STA 108 comes back in range of the stationary STA 102, 104, the mobile generates an FTM request 516 with a backhaul payload that includes only the delivery confirmation. This subsequent FTM procedure may then be completed 518.

Figure 6:
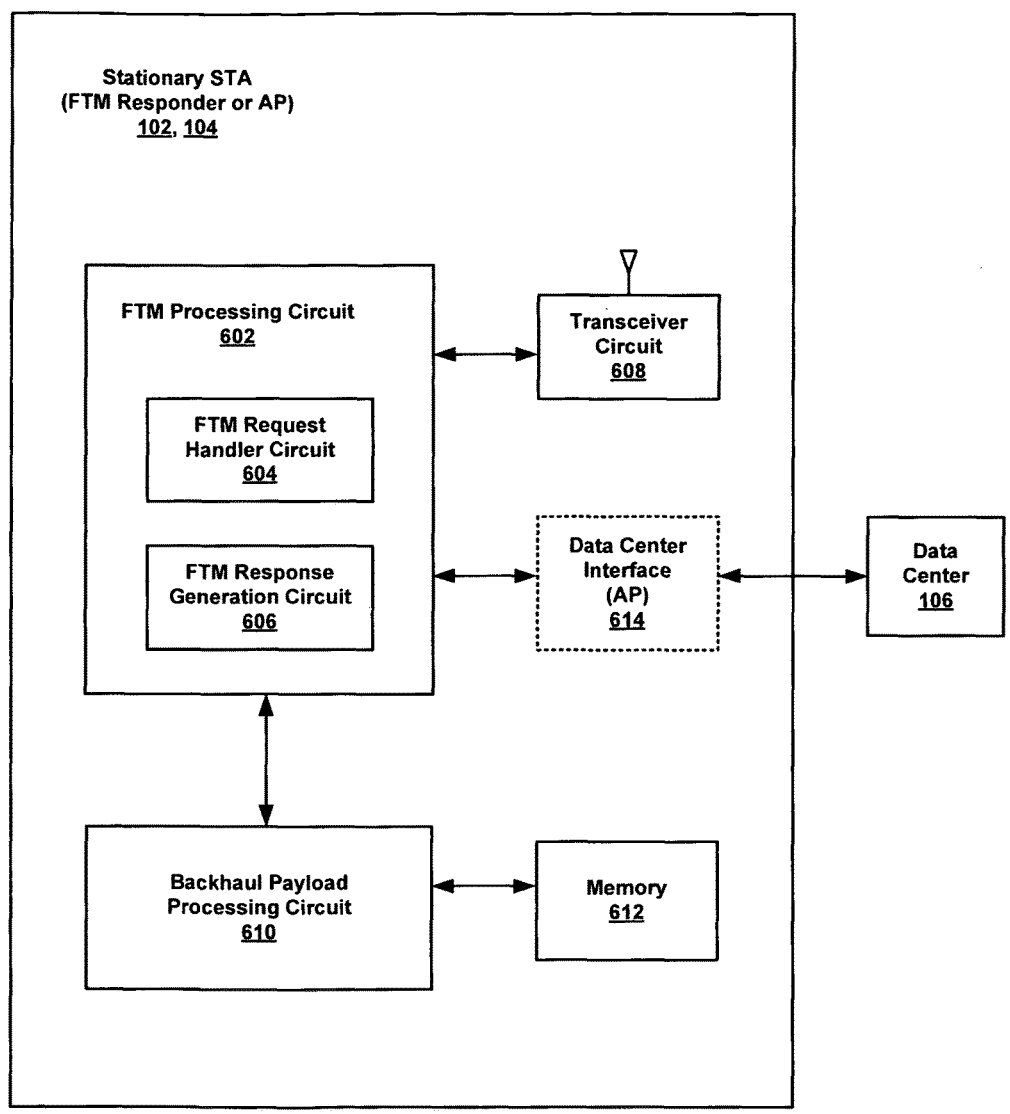
FIG. 6 is a block diagram of a stationary station, in accordance with certain of the embodiments disclosed herein.

FIG. 6 is a block diagram 600 of a stationary station, in accordance with certain of the embodiments disclosed herein. Stationary STA may be configured as an FTM Responder 102 or an AP capable FTM Responder 104. Stationary STA 102, 104 is shown to include an FTM processing circuit 602, a backhaul payload processing circuit 610, a transceiver circuit 608 and memory 612. In the case of an AP capable FTM Responder 104, the STA may also include a data center interface 614. FTM processing circuit 602 may further include an FTM request handler circuit 604 and an FTM response generation circuit 606. Of course, the stationary STA 102, 104 may include other circuits and modules (not shown) configured to perform any additional functions required of a stationary STA.

The FTM request handler circuit 604 may be configured to receive an FTM request message from one or more mobile STAs 108. The FTM request message will generally include FTM data related to the FTM request. The FTM request message may also include a backhaul payload message.

The backhaul payload processing circuit 610 may be configured to determine a requirement, by the stationary STA 102, 104, to transmit backhaul data, for example on a future FTM response message, to a destination device. This requirement may arise, for example, from detection of a low battery condition in the STA or the generation of status information that needs to be shared with other entities. The memory 612 may be configured to store the backhaul data until it is ready to be processed and/or transmitted. The backhaul payload processing circuit 610 may also be configured to extract a backhaul payload message from an FTM request, where the backhaul payload message includes the backhaul data and an address of a destination device for the backhaul data.

The FTM response generation circuit 606 may be configured to generate an FTM response that includes FTM data for the mobile STA 108 and, when needed, additional fields that contain the backhaul payload message. The FTM data contains timing measurements and location information, generated by known techniques in light of the present disclosure, which may be used by the mobile STA to estimate its position. The backhaul payload message includes an address of the destination device and the backhaul data to be transmitted to that device.

The transceiver circuit 608 may be configured to transmit the FTM response to the mobile STA. The FTM response may include backhaul and/or delivery confirmation data. In the case of an AP capable FTM Responder 104, the STA may also include a data center interface 614 configured to transmit and receive messages, including backhaul data, with the data center 106. This may be accomplished through wired and/or wireless connections or through any other suitable technique.

Figure 7:
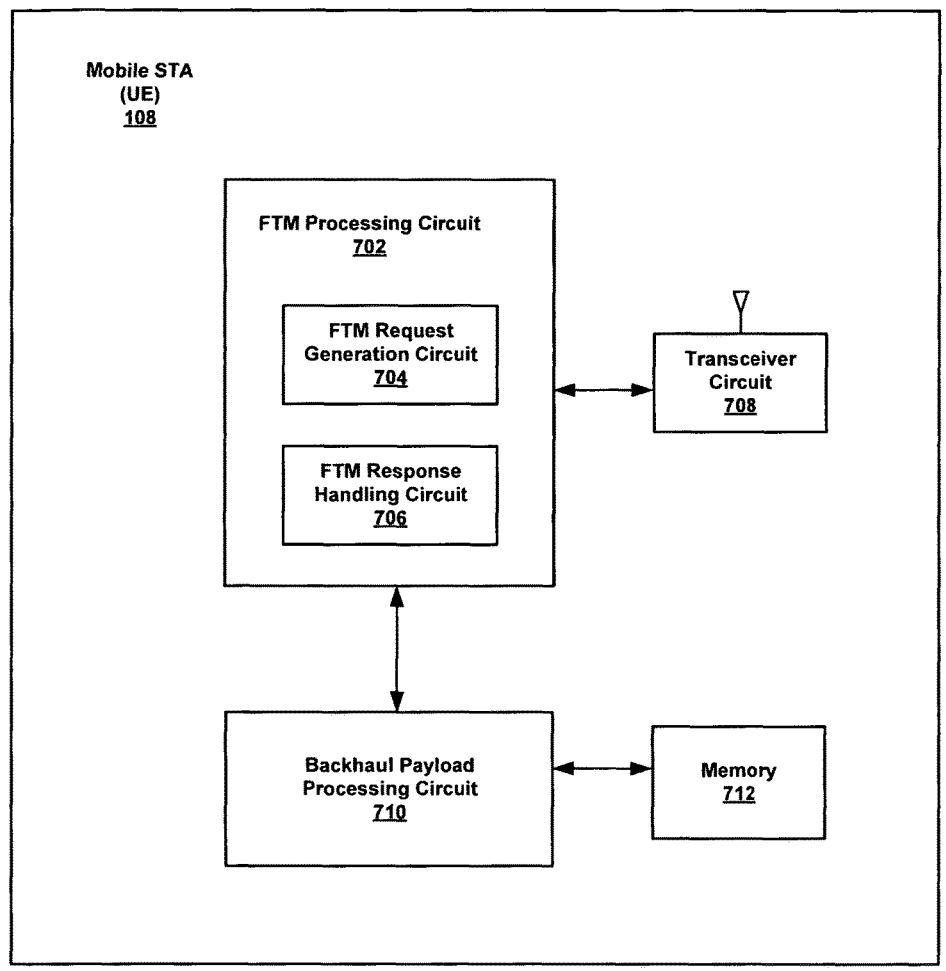
FIG. 7 is a block diagram of a mobile station, in accordance with certain of the embodiments disclosed herein.

FIG. 7 is a block diagram 700 of a mobile station, in accordance with certain of the embodiments disclosed herein. Mobile STA 108 is shown to include an FTM processing circuit 702, a backhaul payload processing circuit 710, a transceiver circuit 708 and memory 712. FTM processing circuit 702 may further include an FTM request generation circuit 704 and an FTM response handler circuit 706. Of course, the mobile STA 108 may include other circuits and modules (not shown) configured to perform any additional functions required of a mobile STA.

The FTM request generation circuit 704 may be configured to generate an FTM request for transmission to an FTM Responder, for example through transceiver circuit 708. The FTM request message will generally include FTM data related to the FTM request. The FTM request message may also include a backhaul payload message which may further include a delivery confirmation.

The FTM response handler circuit 706 may be configured to receive an FTM response from an FTM Responder, for example through transceiver circuit 708. The FTM response will generally include FTM data related to the previous FTM request. The FTM response may also include a backhaul payload message that further includes backhaul data and an address of a destination device for the backhaul data.

The backhaul payload processing circuit 710 may be configured to select an FTM capable wireless access point (AP), based on the address of the destination device, to which the backhaul data may be transmitted in a subsequent FTM request. The backhaul payload processing circuit 710 may further be configured to transmit the backhaul data directly to the data center through an out-of-band (OOB) channel if the destination device address is an OOB address. Memory 712 may be configured to store the backhaul data until it is ready to be processed and/or transmitted.

FIG. 8 illustrates message formats 800 for opportunistic backhauling of data, in accordance with certain of the embodiments disclosed herein. Shown are an example FTM request frame format 816 (associated with FTM requests), an example FTM measurement frame format 844 (associated with FTM responses), and an example backhaul payload information element 866 that may be added onto the FTM request and response frames to support opportunistic backhauling as described herein. These example frame formats may be compatible, at least in part, with IEEE 802.11 Wi-Fi standards, although it will be appreciated that other variations for use with other communication standards are also possible. The length of each field (in bytes or octets) is shown in parentheses beneath the field description or label.

The FTM request frame format 816 is shown to include a number of fields 802 through 812 which identify the frame as an FTM request from a mobile STA to an FTM Responder and provide the information required for an FTM request. The backhaul payload field (or information element—IE) 814 is appended to the end of this frame and will be described in greater detail below.

The FTM measurement frame format 844 is shown to include a number of fields 822 through 842 which identify the frame as an FTM response from an FTM Responder and provide the information required to complete the FTM procedure as requested by the mobile STA, using known techniques in light of the present disclosure. The backhaul payload field or IE 814 is appended to the end of this frame also.

In some embodiments, the backhaul payload IE 814 may include one or more of the fields 850 through 862 as shown, though not necessarily in that order. The element ID field 850 contains a value that identifies the frame 866 as a backhaul payload information element. The length field 852 specifies the length of the frame 866. The backhaul message recipient field 854 contains the address of the destination device or recipient of the backhaul payload.

The address may take one of several forms. A MAC address of a particular station (AP or FTM Responder) may be used when the backhaul information pertains to that particular station. For example, if the data center wants to push configuration changes to a particular FTM Responder, a MAC address may be appropriate. Alternatively, a multicast group address may be employed when a number of stations have use for the information. For example, when an FTM Responder needs to send a notification to the data center, the payload may be delivered to any one of a number of available APs with legacy backhaul capability. The venue owner may assign all of these APs to the same multicast address and, in this case, whenever a passing mobile STA comes within range of any one of them, the message may be delivered.

As yet another alternative, the address may be an out-of-band destination address. This option may generally be used in conjunction with an in-band address (MAC, multicast, etc.). If the mobile STA is able to deliver the message through the OOB channel, it can do so instead of using the in-band procedure. For example, the OOB destination can be a TCP host name and port or the mobile STA can deliver the payload through a cellular connection.

The optional delivery confirmation token 856 may be employed to request a delivery confirmation after the backhaul payload is successfully delivered. For example, the FTM Responder requesting a backhaul message can also request a delivery confirmation by specifying a token. When the mobile STA delivers the backhaul payload to the destination (either in-band or OOB), it generates another backhaul payload including the same confirmation token to the originating FTM Responder.

The optional backhaul message TTL field 858 specifies a "time to live" value for the backhaul data. This may be a time duration, or an expiration time, beyond which any continued attempts to deliver the backhaul payload may cease and the payload may be deleted from storage.

The payload data is contained in the opaque payload content field 862. This data is referred to as "opaque" because it is meaningful only to the originating device and the final destination device and is otherwise ignored by the intermediate devices involved in the transmission and forwarding of the payload. In some embodiments, the payload content 862 may be encrypted so that only the originating device and/or the destination device may access the content. The opaque payload length field 860 specifies the length of the opaque payload content field 862.

In some embodiments, the mobile STA may be configured to facilitate a certification process. For example, after receiving backhaul data for an AP in a first FTM transaction (e.g., a request/response procedure), the mobile STA may be required to transmit that backhaul data back to the AP in a second FTM transaction with that same AP. In some embodiments, that requirement or obligation may include a pre-defined time limit, within which, if the second FTM transaction occurs, the mobile STA must transmit the backhaul data back to the AP. These features may be employed to allow for testing to ensure that the mobile STA implements one or more of the techniques described herein for opportunistic backhauling of data through FTM transactions. For example, in a laboratory setting, test equipment may be configured to simulate an AP (or a real AP may be used) to cause backhaul data to be transmitted to a mobile STA unit under test. The mobile STA may then be monitored to ensure that the backhaul data is transmitted back to the simulated (or real) AP through a subsequent FTM transaction. The subsequent FTM transaction may need to be performed within a required time period to pass the compliance test. A database may also be established to store device IDs for mobile STAs that pass the certification process. The certification process may further be used as part of a Federal Communication Commission (FCC) approval process for the mobile STAs and/or as a precondition for use of a particular logo on the mobile STAs, thus allowing prospective consumers to be informed of these capabilities prior to purchase.

Methodology

Figure 9:
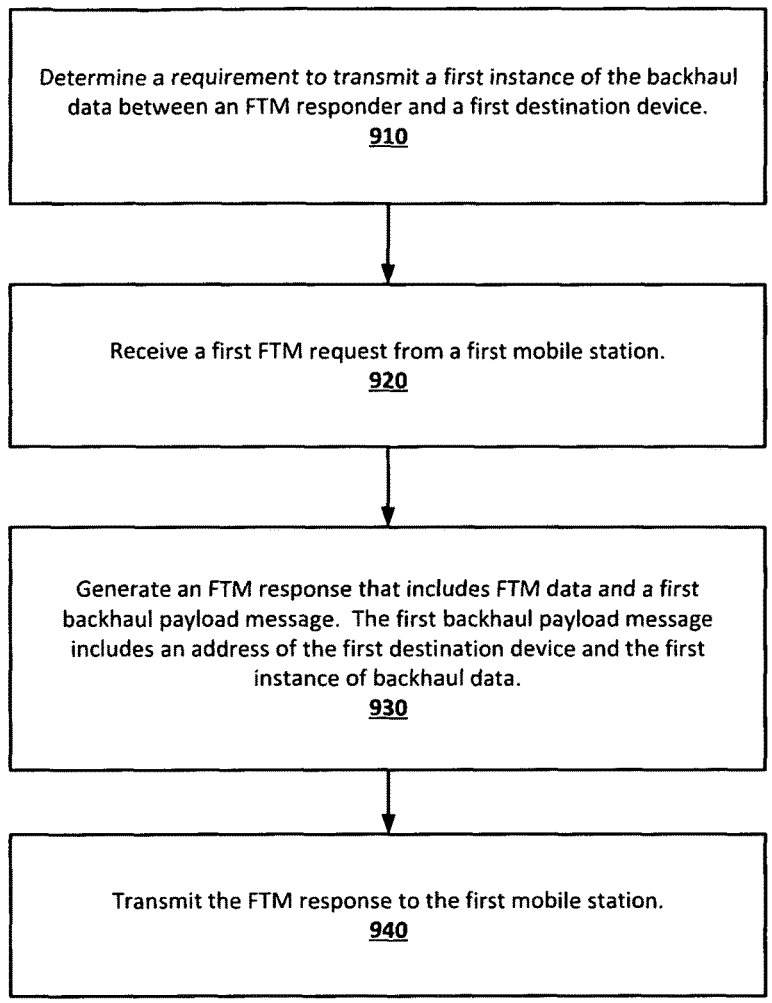
FIG. 9 is a flowchart illustrating a methodology for opportunistic backhauling of data, in accordance with certain of the embodiments disclosed herein.

FIG. 9 is a flowchart illustrating an example method 900 for transferring backhaul data in a deployed network of Fine Time Measurement (FTM) Responders, in accordance with an embodiment of the present disclosure. As can be seen, example method 900 includes a number of phases and sub-processes, the sequence of which may vary from one embodiment to another. However, when considered in the aggregate, these phases and sub-processes form a process for opportunistic transfer of backhaul data in accordance with certain of the embodiments disclosed herein. These embodiments can be implemented, for example using the system architecture illustrated in FIG. 6 for an FTM Responder or FTM capable AP, as described above. However other system architectures can be used in other embodiments, as will be apparent in light of this disclosure. To this end, the correlation of the various functions shown in FIG. 9 to the specific components illustrated in FIG. 6 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 900. Thus other embodiments may have fewer or more modules and/or sub-modules depending on the granularity of implementation. Numerous variations and alternative configurations will be apparent in light of this disclosure.

As illustrated in FIG. 9, in one embodiment, method 900 for transferring backhaul data commences by determining, at operation 910, that a need exists to transmit a first instance of the backhaul data between an FTM Responder and a first destination device. The destination device may be another FTM Responder, a wireless AP or a data center. Next, at operation 920, an FTM request is received from a first mobile station. At operation 930, an FTM response is generated that includes FTM data requested by the mobile station along with a first backhaul payload message. The first backhaul payload message includes an address of the first destination device and further includes the first instance of backhaul data. At operation 940, the FTM response is transmitted to the first mobile station.

Of course, in some embodiments, additional operations may be performed, as previously described in connection with the system in FIG. 6. These additional operations may include, for example, receiving a second FTM request from a second mobile station. In this case, however, the FTM request includes a second backhaul payload message in addition to the FTM data. Further additional operations may include, for example, extracting, from the second backhaul payload message, an address of a second destination device and a second instance of backhaul data; and transmitting the second instance of backhaul data to the second destination device to complete a transfer of backhaul data from one FTM Responder to another.

Figure 10:
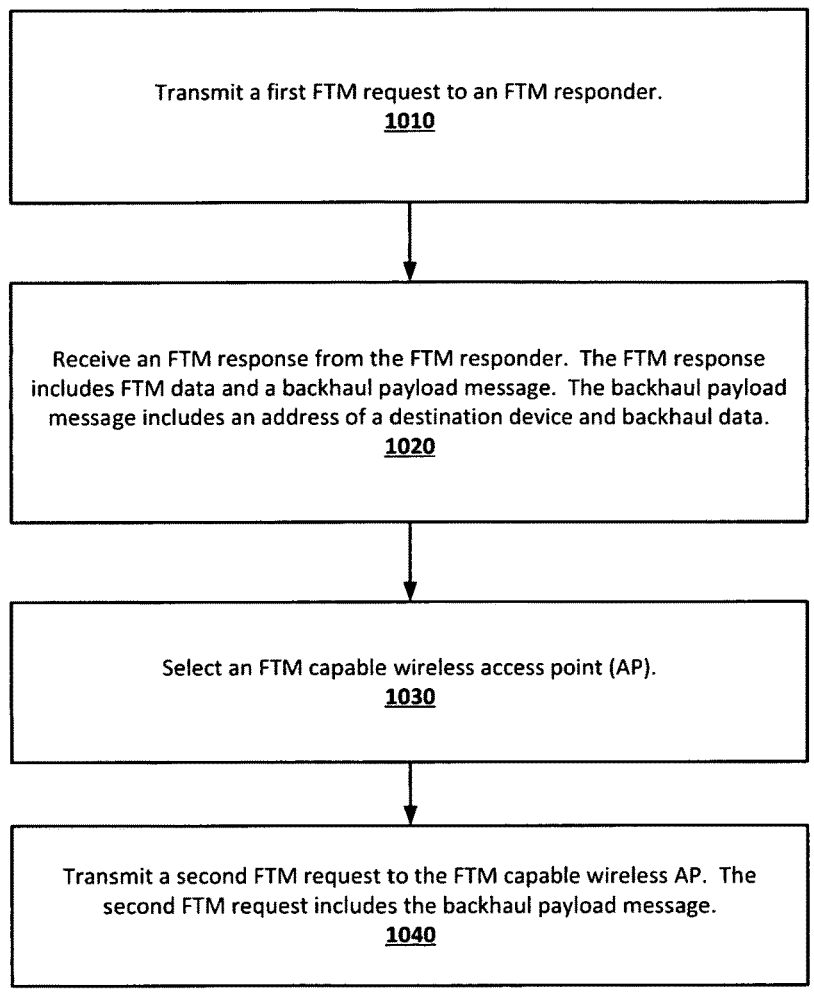
FIG. 10 is a flowchart illustrating another methodology for opportunistic backhauling of data, in accordance with certain of the embodiments disclosed herein.

FIG. 10 is a flowchart illustrating another example method 1000 for opportunistic transfer of backhaul data, in accordance with another embodiment of the present disclosure. As can be seen, example method 1000 also includes a number of phases and sub-processes, the sequence of which may vary from one embodiment to another. These embodiments can be implemented, for example using the system architecture illustrated in FIG. 7 for a mobile station, as described above. However other system architectures can be used in other embodiments, as will be apparent in light of this disclosure. To this end, the correlation of the various functions shown in FIG. 10 to the specific components illustrated in FIG. 7 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 1000. Thus other embodiments may have fewer or more modules and/or sub-modules depending on the granularity of implementation. Numerous variations and alternative configurations will be apparent in light of this disclosure.

As illustrated in FIG. 10, in one embodiment, method 1000 for transferring backhaul data commences by transmitting, at operation 1010, a first FTM request to an FTM Responder. The FTM request may originate from a mobile station. Next, at operation 1020, an FTM response is received from the FTM Responder. The FTM response includes the requested FTM data as well as a backhaul payload message. The backhaul payload message includes an address of a destination device for the backhaul data along with the backhaul data. The backhaul data may be stored by the mobile station for any length of time. At operation 1030, an FTM capable wireless access point (AP) is selected, matching or otherwise based on the address of the destination device. The selection may or may not be influenced by the mobile station having backhaul data to be delivered to that AP. The selection may also be based on other factors including the suitability of the AP for positioning. At operation 1040, a second FTM request is transmitted to the selected FTM capable wireless AP. The second FTM request includes the backhaul payload message.

In some embodiments, additional operations may be performed, as previously described in connection with the system in FIG. 7. These additional operations may include, for example, transmitting the backhaul data to a data center through an out-of-band (OOB) channel if the address of the destination device is an OOB address. Further additional operations may include, for example, transmitting a delivery confirmation to the FTM Responder.

Example System

Figure 11:
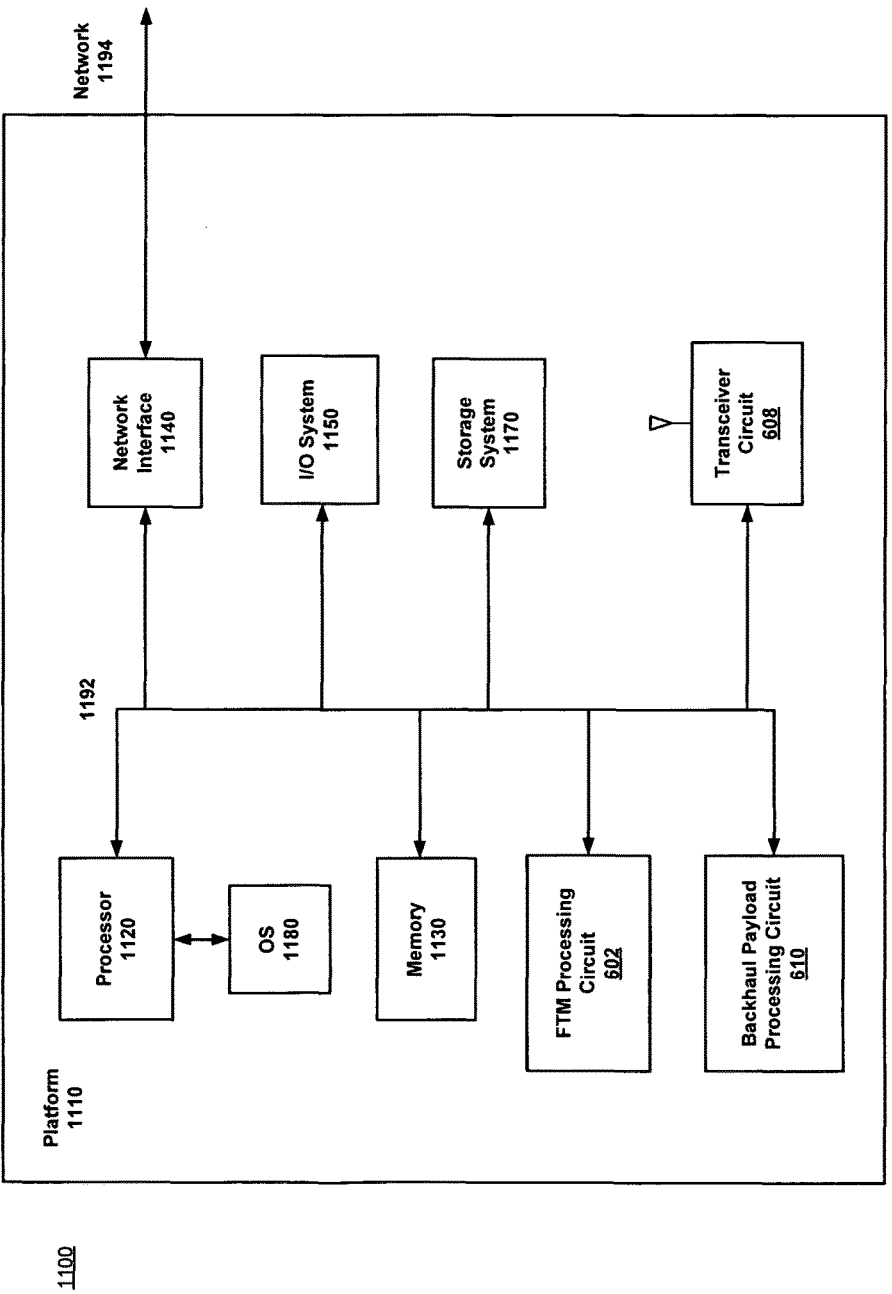
FIG. 11 is a block diagram schematically illustrating an FTM Responder system platform, configured in accordance with certain of the embodiments disclosed herein.

FIG. 11 illustrates an example system 1100 that may carry out opportunistic backhauling of data for FTM Responder systems, as described herein. In some embodiments, system 1100 comprises a platform 1110 which may host an FTM Responder or FTM capable wireless AP.

In some embodiments, platform 1110 may comprise any combination of a processor 1120, a memory 1130, FTM processing circuit 602, backhaul payload processing circuit 610, a network interface 1140, an input/output (I/O) system 1150, a storage system 1170 and a transceiver circuit 608. As can be further seen, a bus and/or interconnect 1192 is also provided to allow for communication between the various components listed above and/or other components not shown. Platform 1110 can be coupled to a network 1194 through network interface 1140 to allow for communications with other computing devices, platforms or resources, including the data center 106. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor or a graphics processing unit, to assist in control and processing operations associated with system 1100. In some embodiments, the processor 1120 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), Linux, or Apple OS (Apple Inc., Cupertino, Calif.) and/or various real-time operating systems. As will be appreciated in light of this disclosure, the techniques provided herein can be implemented without regard to the particular operating system provided in conjunction with system 1100, and therefore may also be implemented using any suitable existing or subsequently-developed platform.

Network interface module 1140 can be any appropriate network chip or chipset which allows for wired and/or wireless connection between other components of computer system 1100 and/or network 1194, thereby enabling system 1100 to communicate with other local and/or remote computing systems, servers, and/or resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of platform 1110. I/O devices may include, but not be limited to, a display element, keyboard, mouse, speaker, microphone, etc.

I/O system 1150 may include a graphics subsystem configured to perform processing of images for a display element. Graphics subsystem may be a graphics processing unit or a visual processing unit (VPU), for example. An analog or digital interface may be used to communicatively couple graphics subsystem and a display element. In some embodiment, the graphics subsystem could be integrated into processor 1120 or any chipset of platform 1110.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

FTM Processing circuit 602 and backhaul payload processing circuit 610 are configured to handle FTM requests received from passing mobile stations and to generate FTM responses that may include backhaul payload data for opportunistic transmission, via the mobile stations, to other FTM Responders, wireless APs or data centers. FTM Processing circuit 602 and backhaul payload processing circuit 610 can be implemented or otherwise used in conjunction with a variety of suitable software and/or hardware that is coupled to or that otherwise forms a part of system 1100.

In some embodiments, FTM Processing circuit 602 and backhaul payload processing circuit 610 may be installed local to system 1100, as shown in the example embodiment of FIG. 11. Alternatively, system 1100 can be implemented in a client-server arrangement wherein at least some functionality associated with these circuits are provided to system 1100 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 1194 or remotely coupled to network 1194 by one or more other networks and/or communication channels. In some cases access to resources on a given network or computing system may require credentials such as usernames, passwords, and/or compliance with any other suitable security mechanism.

In various embodiments, system 1100 may be implemented as a wireless system, a wired system, or a combination of both. When implemented as a wireless system, system 1100 may include components and interfaces suitable for communicating over a wireless shared media, such as one or more antennae, transmitters, receivers, transceivers, amplifiers, filters, control logic, and so forth, which may be associated with transceiver circuit 608. An example of wireless shared media may include portions of a wireless spectrum, such as the radio frequency spectrum and so forth. When implemented as a wired system, system 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the methodologies for opportunistic data backhauling, disclosed herein, to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 1100 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is at least one non-transitory computer program product including one or more machine readable storage mediums having instructions encoded thereon that, when executed by one or more processors, result in the following operations for transferring backhaul data in a communication network. The operations comprise: determining, by a Fine Time Measurement (FTM) responder, a requirement to transmit a first instance of backhaul data to a first destination device; receiving, by the FTM responder, a first FTM request from a first mobile station; generating, by the FTM responder, an FTM response that includes FTM data responsive to the request and a first backhaul payload message, wherein the first backhaul payload message includes an address of the first destination device and further includes the first instance of backhaul data; and transmitting, by the FTM responder, the FTM response to the first mobile station.

Example 2 includes the subject matter of Example 1, further comprising: receiving, by the FTM responder, a second FTM request from a second mobile station, wherein the second FTM request includes FTM data and a second backhaul payload message; extracting, by the FTM responder, from the second backhaul payload message, an address of a second destination device and a second instance of backhaul data; and transmitting, by the FTM responder, the second instance of backhaul data to the second destination device.

Example 3 includes the subject matter of Examples 1 and 2, wherein the first and second destination devices are selected from the group consisting of an FTM Responder, a wireless access point (AP), and a backend data center for managing the communication network.

Example 4 includes the subject matter of Examples 1-3, further comprising transmitting a delivery confirmation to at least one of the first and second mobile stations.

Example 5 includes the subject matter of Examples 1-4, wherein the backhaul data includes at least one of a battery status of the FTM Responder or a physical location of the FTM Responder.

Example 6 includes the subject matter of Examples 1-5, wherein the backhaul data includes backend data not related to the request from the first mobile station.

Example 7 includes the subject matter of Examples 1-6, wherein the address is one of a media access control (MAC) address, a multicast group address or a Transmission Control Protocol (TCP) address.

Example 8 is a Fine Time Measurement (FTM) Responder comprising: a backhaul payload processing circuit to determine a requirement to transmit a first instance of backhaul data to a first destination device; an FTM request handler circuit to receive a first FTM request from a first mobile station; an FTM response generation circuit to generate an FTM response that includes FTM data responsive to the request and a first backhaul payload message, wherein the first backhaul payload message includes an address of the first destination device and further includes the first instance of backhaul data; and a transceiver circuit to transmit the FTM response to the first mobile station.

Example 9 includes the subject matter of Example 8, wherein the FTM Responder is an FTM capable wireless access point (AP).

Example 10 includes the subject matter of Examples 8 and 9, wherein the FTM request handler circuit is further to receive a second FTM request from a second mobile station, the second FTM request including FTM data and a second backhaul payload message; the backhaul payload processing circuit is further to extract, from the second backhaul payload message, an address of a second destination device and a second instance of backhaul data; and the transceiver is further to transmit the second instance of backhaul data to the second destination device.

Example 11 includes the subject matter of Examples 8-10, wherein the first and second destination devices are selected from the group consisting of an FTM Responder, a wireless AP and a backend data center for managing a communication network.

Example 12 includes the subject matter of Examples 8-11, wherein the transceiver is further to transmit a delivery confirmation to at least one of the first and second mobile stations.

Example 13 includes the subject matter of Examples 8-12, wherein the backhaul data includes at least one of a battery status of the FTM Responder or a physical location of the FTM Responder.

Example 14 includes the subject matter of Examples 8-13, wherein the backhaul data includes backend data not related to the request from the first mobile station.

Example 15 includes the subject matter of Examples 8-14, wherein the address is one of a media access control (MAC) address, a multicast group address or a Transmission Control Protocol (TCP) address.

Example 16 is at least one non-transitory computer readable storage medium having instructions encoded thereon that, when executed by one or more processors, result in the following operations for transferring backhaul data in a communication network. The operations comprise: transmitting, by a mobile computing device, a first Fine Time Measurement (FTM) request to an FTM Responder; receiving, by the mobile computing device, an FTM response from the FTM Responder, the FTM response including FTM data responsive to the request and a backhaul payload message, wherein the backhaul payload message includes an address of a destination device and further includes backhaul data; and transmitting, by the mobile computing device, a second FTM request to an FTM capable wireless access point (AP), the second FTM request including the backhaul payload message.

Example 17 includes the subject matter of Example 16, further comprising transmitting the backhaul data to a backend data center through an out-of-band (OOB) channel based on the address of the destination device, wherein the address is an OOB address, the backend data center to manage the communication network.

Example 18 includes the subject matter of Examples 16 and 17, further comprising transmitting a delivery confirmation to the FTM Responder.

Example 19 includes the subject matter of Examples 16-18, wherein the backhaul data includes at least one of a battery status of an FTM Responder or a physical location of an FTM Responder.

Example 20 includes the subject matter of Examples 16-19, wherein the address is one of a media access control (MAC) address, a multicast group address or a Transmission Control Protocol (TCP) address.

Example 21 includes the subject matter of Examples 16-20, wherein the backhaul payload message further includes an expiration time to indicate a time after which the backhaul payload message should not be transmitted.

Example 22 is a wireless mobile station device comprising: a Fine Time Measurement (FTM) request generation circuit to generate a first FTM request for transmission to an FTM Responder; an FTM response handling circuit to receive an FTM response from the FTM Responder, the FTM response including FTM data responsive to the request and a backhaul payload message, wherein the backhaul payload message includes an address of a destination device and further includes backhaul data; and a backhaul payload processing circuit to generate a second FTM request to an FTM capable wireless access point (AP), the second FTM request including the backhaul payload message.

Example 23 includes the subject matter of Example 22, wherein the backhaul payload processing circuit is further to transmit the backhaul data to a backend data center through an out-of-band (OOB) channel based on the address of the destination device, wherein the address is an OOB address, the backend data center to manage a communication network.

Example 24 includes the subject matter of Examples 22 and 23, wherein the FTM request generation circuit is further to generate a delivery confirmation for transmission to the FTM Responder.

Example 25 includes the subject matter of Examples 22-24, wherein the backhaul data includes at least one of a battery status of an FTM Responder or a physical location of an FTM Responder.

Example 26 includes the subject matter of Examples 22-25, wherein the address is one of a media access control (MAC) address, a multicast group address or a Transmission Control Protocol (TCP) address.

Example 27 includes the subject matter of Examples 22-26, wherein the backhaul payload message further includes an expiration time to indicate a time after which the backhaul payload message should not be transmitted.

Example 28 is a method for transferring backhaul data in a communication network. The method comprises: determining, by a Fine Time Measurement (FTM) responder, a requirement to transmit a first instance of backhaul data to a first destination device; receiving, by the FTM responder, a first FTM request from a first mobile station; generating, by the FTM responder, an FTM response that includes FTM data responsive to the request and a first backhaul payload message, wherein the first backhaul payload message includes an address of the first destination device and further includes the first instance of backhaul data; and transmitting, by the FTM responder, the FTM response to the first mobile station.

Example 29 includes the subject matter of Example 28, further comprising: receiving, by the FTM responder, a second FTM request from a second mobile station, wherein the second FTM request includes FTM data and a second backhaul payload message; extracting, by the FTM responder, from the second backhaul payload message, an address of a second destination device and a second instance of backhaul data; and transmitting, by the FTM responder, the second instance of backhaul data to the second destination device.

Example 30 includes the subject matter of Examples 28 and 29, wherein the first and second destination devices are selected from the group consisting of an FTM Responder, a wireless access point (AP), and a backend data center for managing the communication network.

Example 31 includes the subject matter of Examples 28-30, further comprising transmitting a delivery confirmation to at least one of the first and second mobile stations.

Example 32 includes the subject matter of Examples 28-31, wherein the backhaul data includes at least one of a battery status of the FTM Responder or a physical location of the FTM Responder.

Example 33 includes the subject matter of Examples 28-32, wherein the backhaul data includes backend data not related to the request from the first mobile station.

Example 34 includes the subject matter of Examples 28-33, wherein the address is one of a media access control (MAC) address, a multicast group address or a Transmission Control Protocol (TCP) address.

Example 35 is a system for transferring backhaul data in a communication network. The system comprises: means for determining, by a Fine Time Measurement (FTM) responder, a requirement to transmit a first instance of backhaul data to a first destination device; means for receiving, by the FTM responder, a first FTM request from a first mobile station; means for generating, by the FTM responder, an FTM response that includes FTM data responsive to the request and a first backhaul payload message, wherein the first backhaul payload message includes an address of the first destination device and further includes the first instance of backhaul data; and means for transmitting, by the FTM responder, the FTM response to the first mobile station.

Example 36 includes the subject matter of Example 35, further comprising: means for receiving, by the FTM responder, a second FTM request from a second mobile station, wherein the second FTM request includes FTM data and a second backhaul payload message; means for extracting, by the FTM responder, from the second backhaul payload message, an address of a second destination device and a second instance of backhaul data; and means for transmitting, by the FTM responder, the second instance of backhaul data to the second destination device.

Example 37 includes the subject matter of Examples 35 and 36, wherein the first and second destination devices are selected from the group consisting of an FTM Responder, a wireless access point (AP), and a backend data center for managing the communication network.

Example 38 includes the subject matter of Examples 35-37, further comprising means for transmitting a delivery confirmation to at least one of the first and second mobile stations.

Example 39 includes the subject matter of Examples 35-38, wherein the backhaul data includes at least one of a battery status of the FTM Responder or a physical location of the FTM Responder.

Example 40 includes the subject matter of Examples 35-39, wherein the backhaul data includes backend data not related to the request from the first mobile station.

Example 41 includes the subject matter of Examples 35-40, wherein the address is one of a media access control (MAC) address, a multicast group address or a Transmission Control Protocol (TCP) address.

Example 42 is a method for transferring backhaul data in a communication network. The method comprises: transmitting, by a mobile computing device, a first Fine Time Measurement (FTM) request to an FTM Responder; receiving, by the mobile computing device, an FTM response from the FTM Responder, the FTM response including FTM data responsive to the request and a backhaul payload message, wherein the backhaul payload message includes an address of a destination device and further includes backhaul data; and transmitting, by the mobile computing device, a second FTM request to an FTM capable wireless access point (AP), the second FTM request including the backhaul payload message.

Example 43 includes the subject matter of Example 42, further comprising transmitting the backhaul data to a backend data center through an out-of-band (OOB) channel based on the address of the destination device, wherein the address is an OOB address, the backend data center to manage the communication network.

Example 44 includes the subject matter of Examples 42 and 43, further comprising transmitting a delivery confirmation to the FTM Responder.

Example 45 includes the subject matter of Examples 42-44, wherein the backhaul data includes at least one of a battery status of an FTM Responder or a physical location of an FTM Responder.

Example 46 includes the subject matter of Examples 42-45, wherein the address is one of a media access control (MAC) address, a multicast group address or a Transmission Control Protocol (TCP) address.

Example 47 includes the subject matter of Examples 42-46, wherein the backhaul payload message further includes an expiration time to indicate a time after which the backhaul payload message should not be transmitted.

Example 48 is a system for transferring backhaul data in a communication network. The system comprises: means for transmitting, by a mobile computing device, a first Fine Time Measurement (FTM) request to an FTM Responder; means for receiving, by the mobile computing device, an FTM response from the FTM Responder, the FTM response including FTM data responsive to the request and a backhaul payload message, wherein the backhaul payload message includes an address of a destination device and further includes backhaul data; and means for transmitting, by the mobile computing device, a second FTM request to an FTM capable wireless access point (AP), the second FTM request including the backhaul payload message.

Example 49 includes the subject matter of Example 48, further comprising means for transmitting the backhaul data to a backend data center through an out-of-band (OOB) channel based on the address of the destination device, wherein the address is an OOB address, the backend data center to manage the communication network.

Example 50 includes the subject matter of Examples 48 and 49, further comprising means for transmitting a delivery confirmation to the FTM Responder.

Example 51 includes the subject matter of Examples 48-50, wherein the backhaul data includes at least one of a battery status of an FTM Responder or a physical location of an FTM Responder.

Example 52 includes the subject matter of Examples 48-51, wherein the address is one of a media access control (MAC) address, a multicast group address or a Transmission Control Protocol (TCP) address.

Example 53 includes the subject matter of Examples 48-52, wherein the backhaul payload message further includes an expiration time to indicate a time after which the backhaul payload message should not be transmitted.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. At least one non-transitory computer program product including one or more machine readable storage mediums having instructions encoded thereon that, when executed by one or more processors, result in the following operations for transferring backhaul data in a communication network, the operations comprising:

determining, by a Fine Time Measurement (FTM) responder, a requirement to transmit a first instance of backhaul data to a first destination device;

receiving, by the FTM responder, a first FTM request from a first mobile station;

generating, by the FTM responder, an FTM response that includes FTM data responsive to the first FTM request and a first backhaul payload message, wherein the first backhaul payload message includes an address of the first destination device for receipt of the backhaul data, and further includes the first instance of backhaul data; and transmitting, by the FTM responder, the FTM response to the first mobile station.

2. The non-transitory computer program product of claim 1, further comprising:
  receiving, by the FTM responder, a second FTM request from a second mobile station, wherein the second FTM request includes FTM data and a second backhaul payload message;
  extracting, by the FTM responder, from the second backhaul payload message, an address of a second destination device and a second instance of backhaul data; and
  transmitting, by the FTM responder, the second instance of backhaul data to the second destination device.

3. The non-transitory computer program product of claim 2, wherein the first and second destination devices are selected from the group consisting of an FTM Responder, a wireless access point (AP), and a backend data center for managing the communication network.

4. The non-transitory computer program product of claim 2, further comprising transmitting a delivery confirmation to at least one of the first and second mobile stations.

5. The non-transitory computer program product of claim 1, wherein the backhaul data includes at least one of a battery status of the FTM Responder or a physical location of the FTM Responder.

6. The non-transitory computer program product of claim 1, wherein the backhaul data includes backend data not related to the first FTM request from the first mobile station.

7. The non-transitory computer program product of claim 1, wherein the address is one of a media access control (MAC) address, a multicast group address or a Transmission Control Protocol (TCP) address.

8. A Fine Time Measurement (FTM) Responder comprising:
  a backhaul payload processing circuit to determine a requirement to transmit a first instance of backhaul data to a first destination device;
  an FTM request handler circuit to receive a first FTM request from a first mobile station;
  an FTM response generation circuit to generate an FTM response that includes FTM data responsive to the first FTM request and a first backhaul payload message, wherein the first backhaul payload message includes an address of the first destination device for receipt of the backhaul data, and further includes the first instance of backhaul data; and
  a transceiver circuit to transmit the FTM response to the first mobile station.

9. The FTM Responder of claim 8, wherein the FTM Responder is an FTM capable wireless access point (AP).

10. The FTM Responder of claim 8, wherein the FTM request handler circuit is further to receive a second FTM request from a second mobile station, the second FTM request including FTM data and a second backhaul payload message; the backhaul payload processing circuit is further to extract, from the second backhaul payload message, an address of a second destination device and a second instance of backhaul data; and the transceiver is further to transmit the second instance of backhaul data to the second destination device.

11. The FTM Responder of claim 10, wherein the first and second destination devices are selected from the group consisting of an FTM Responder, a wireless AP and a backend data center for managing a communication network.

12. The FTM Responder of claim 10, wherein the transceiver is further to transmit a delivery confirmation to at least one of the first and second mobile stations.

13. The FTM Responder of claim 8, wherein the backhaul data includes at least one of a battery status of the FTM Responder or a physical location of the FTM Responder.

14. The FTM Responder of claim 8, wherein the backhaul data includes backend data not related to the first FTM request from the first mobile station.

15. The FTM Responder of claim 8, wherein the address is one of a media access control (MAC) address, a multicast group address or a Transmission Control Protocol (TCP) address.

16. At least one non-transitory computer readable storage medium having instructions encoded thereon that, when executed by one or more processors, result in the following operations for transferring backhaul data in a communication network, the operations comprising:
  transmitting, by a mobile computing device, a first Fine Time Measurement (FTM) request to an FTM Responder;
  receiving, by the mobile computing device, an FTM response from the FTM Responder, the FTM response including FTM data responsive to the first FTM request and a backhaul payload message, wherein the backhaul payload message includes an address of a destination device for receipt of backhaul data, and the backhaul payload message further includes the backhaul data; and
  transmitting, by the mobile computing device, a second FTM request to an FTM capable wireless access point (AP), the second FTM request including the backhaul payload message.

17. The computer readable storage medium of claim 16, further comprising transmitting the backhaul data to a backend data center through an out-of-band (OOB) channel based on the address of the destination device, wherein the address is an OOB address, the backend data center to manage the communication network.

18. The computer readable storage medium of claim 16, further comprising transmitting a delivery confirmation to the FTM Responder.

19. The computer readable storage medium of claim 16, wherein the backhaul data includes at least one of a battery status of an FTM Responder or a physical location of an FTM Responder.

20. The computer readable storage medium of claim 16, wherein the address is one of a media access control (MAC) address, a multicast group address or a Transmission Control Protocol (TCP) address.

21. The computer readable storage medium of claim 16, wherein the backhaul payload message further includes an expiration time to indicate a time after which the backhaul payload message should not be transmitted.

22. A wireless mobile station device comprising:
  a Fine Time Measurement (FTM) request generation circuit to generate a first FTM request for transmission to an FTM Responder;
  an FTM response handling circuit to receive an FTM response from the FTM Responder, the FTM response including FTM data responsive to the first FTM request and a backhaul payload message, wherein the backhaul payload message includes an address of a destination device for receipt of backhaul data, and the backhaul payload message further includes the backhaul data; and
  a backhaul payload processing circuit to generate a second FTM request to an FTM capable wireless access point (AP), the second FTM request including the backhaul payload message.

23. The device of claim 22, wherein the backhaul payload processing circuit is further to transmit the backhaul data to a backend data center through an out-of-band (OOB) channel based on the address of the destination device, wherein the address is an OOB address, the backend data center to manage a communication network.

24. The device of claim 22, wherein the FTM request generation circuit is further to generate a delivery confirmation for transmission to the FTM Responder.

25. The device of claim 22, wherein the backhaul data includes at least one of a battery status of an FTM Responder or a physical location of an FTM Responder.

26. The device of claim 22, wherein the address is one of a media access control (MAC) address, a multicast group address or a Transmission Control Protocol (TCP) address.

27. The device of claim 22, wherein the backhaul payload message further includes an expiration time to indicate a time after which the backhaul payload message should not be transmitted.

* * * * *